United States Patent
Broz et al.

(10) Patent No.: US 9,639,706 B2
(45) Date of Patent: May 2, 2017

(54) INTER-VIRTUAL MACHINE COMMUNICATION

(71) Applicant: International Business Machines Corporation, Armonk, NY (US)

(72) Inventors: Michal Broz, Austin, TX (US); Bernadette A. Carter, Raleigh, NC (US); Melba I. Lopez, Austin, TX (US); Matthew G. Marum, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/625,708

(22) Filed: Feb. 19, 2015

(65) Prior Publication Data

US 2016/0246974 A1 Aug. 25, 2016

(51) Int. Cl.
*H04L 29/06* (2006.01)
*G06F 21/60* (2013.01)
*G06F 9/455* (2006.01)
*G06F 9/54* (2006.01)
*G06F 21/53* (2013.01)

(52) U.S. Cl.
CPC ........ *G06F 21/606* (2013.01); *G06F 9/45558* (2013.01); *G06F 9/54* (2013.01); *G06F 21/53* (2013.01); *G06F 2009/4557* (2013.01); *G06F 2009/45587* (2013.01)

(58) Field of Classification Search
None
See application file for complete search history.

(56) References Cited

U.S. PATENT DOCUMENTS

| 8,397,287 B2* | 3/2013 | Mullick | H04L 63/0272 713/153 |
| 8,429,675 B1 | 4/2013 | Radhakrishnan et al. | |
| 8,473,961 B2* | 6/2013 | Krsti | G06F 21/10 8/104 |

(Continued)

OTHER PUBLICATIONS

Cicotti, P.; Taufer, M.; Chien, A. DGMonitor: a performance monitoring tool for sandbox-based desktop grid platforms. 18th International Parallel and Distributed Processing Symposium. Pub. Date: 2004. http://ieeexplore.ieee.org/stamp/stamp.jsp?arnumber=1303303.*

(Continued)

*Primary Examiner* — Jeremiah Avery
(74) *Attorney, Agent, or Firm* — Scully, Scott, Murphy & Presser, P.C.; Rahan Uddin (57) ABSTRACT

Techniques to interface with an isolated compute environment may be provided. An external interface may be provided by the isolated compute environment identifying a list of applications. Responsive to receiving a first request to access a first application in the list of applications from a source outside of the isolated compute environment, the isolated compute environment may provide interactive support to the first application to share the first application and the first application's data with the source. Responsive to receiving a second request to access a second application not in the list of applications from the source outside of the isolated compute environment, the isolated compute environment may prevent the interactive support to the second application.

20 Claims, 4 Drawing Sheets

(56) References Cited

U.S. PATENT DOCUMENTS

| | | | | |
|---|---|---|---|---|
| 8,612,971 | B1* | 12/2013 | Fitzgerald | G06F 9/45533 718/1 |
| 2004/0031052 | A1* | 2/2004 | Wannamaker | A63F 13/12 725/61 |
| 2008/0098391 | A1 | 4/2008 | Medvedev et al. | |
| 2009/0113110 | A1* | 4/2009 | Chen | G06F 9/4426 711/6 |
| 2011/0107406 | A1* | 5/2011 | Frost | G06F 9/45558 726/6 |
| 2011/0277027 | A1* | 11/2011 | Hayton | H04L 63/0815 726/8 |
| 2012/0059876 | A1 | 3/2012 | Chinta et al. | |
| 2012/0185913 | A1* | 7/2012 | Martinez | G06F 9/455 726/1 |
| 2013/0227641 | A1* | 8/2013 | White | H04L 63/20 726/1 |
| 2013/0268997 | A1* | 10/2013 | Clancy, III | G06F 21/53 726/1 |
| 2013/0298201 | A1* | 11/2013 | Aravindakshan | H04L 63/0272 726/4 |
| 2013/0312058 | A1* | 11/2013 | Thompson | G06F 21/54 726/1 |
| 2016/0191465 | A1* | 6/2016 | Thomas | H04L 63/0263 726/1 |

OTHER PUBLICATIONS

Ando, Ruo; Zhang, Zong-Hua; Kadobayashi, Youki; Shinoda, Yoichi. A Dynamic Protection System of Web Server in Virtual Cluster Using Live Migration. Eighth International IEEE Conference on Dependable, Autonomic and Secure Computing. Pub. Date: 2009. http://ieeexplore.ieee.org/stamp/stamp.jsp?arnumber=5380281.*

Csaba Marosi, Attila; Kacsuk, Peter; Fedak, Gilles; Lodygensky, Oleg. Sandboxing for Desktop Grids Using Virtualization. 2010 18th Euromicro International Conference on Parallel, Distributed and Network-Based Processing (PDP). http://ieeexplore.ieee.org/stamp/stamp.jsp?arnumber=5452475.*

"Hypervisor Top-Level Functional Specification: Windows Sever 2102" (Aug. 8, 2012) 392 pages, Version 3.0a.

"Virtual application delivery to mobilize your business" Xen App Citrix, http://www.citrix.com/products/xenapp/overview.html, viewed on Sep. 9, 2014, 4 pages.

Citrix Receiver "Access apps and desktops on any device", http://www.citrix.com/go/receiver.html, viewed on Sep. 9, 2014, 2 pages.

X.org Foundation "Xorg", http://www.x.org/wiki/, viewed on Sep. 9, 2014, 2 pages.

Drummonds, "VMkernel Scheduler" VMkernel Scheduler | VMware Commiunities, http: communites.vmware.com/docs/Doc-5501, viewed on Feb. 13, 2015, 9 pages.

Rouse, M. "VMkernel" http://searchvmware.techtarget.com/definition/VMkernel, viewed on Feb. 13, 2015, 5 pages.

* cited by examiner

FIG. 4

INTER-VIRTUAL MACHINE COMMUNICATION

FIELD

The present application relates generally to compute devices and compute applications, and more particularly to enabling interfacing with an isolated computing environment, e.g., inter-virtual machine communication.

BACKGROUND

One or more compute devices may be isolated from other compute devices. For example, they may be run and be managed within an isolated environment independent of the other computers or compute devices. The present disclosure describes interfacing with an isolated computing environment, for example, by a machine outside of the isolated computing environment.

BRIEF SUMMARY

A method and system for interfacing with an isolated compute environment may be provided. The method, in one aspect may comprise, providing an external interface by the isolated compute environment identifying a list of applications. The method may also comprise, responsive to receiving a first request to access a first application in the list of applications from a source outside of the isolated compute environment, providing interactive support to the first application to share the first application and the first application's data. The method may also comprise, responsive to receiving a second request to access a second application not in the list of applications from the source outside of the isolated compute environment, preventing the interactive support to the second application.

A system of interfacing with an isolated compute environment, in one aspect, may comprise a plurality of hardware resources within the isolated compute environment. One or more applications may be executable in the isolated compute environment. An external interface may be provided by the isolated compute environment identifying a list of applications. Responsive to receiving a first request to access a first application in the list of applications from a source outside of the isolated compute environment, the isolated compute environment may provide interactive support to the first application to share the first application and the first application's data. Responsive to receiving a second request to access a second application not in the list of applications from the source outside of the isolated compute environment, the isolated compute environment may prevent the interactive support to the second application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In the present disclosure, the terms "computer" and "compute device" are used interchangeably and refer to a device having one or more hardware processors. Techniques are presented for computer or compute environments to share applications and their data. For instance, a methodology of the present disclosure may identify a list of applications and associated data the applications use, from a first compute environment, to be shared with a second compute environment. The term "environment" herein refers to a computer or compute environment, and those terms and used interchangeably in the present disclosure. A methodology in one embodiment allows a user to directly connect to an application instance in another isolated environment. In one aspect, this means that the methodology in one embodiment allows the user to not only access the application, but also access the data stored by the application in the isolated environment.

For example, if a messaging client is opened in environment B from environment A, via a methodology of the present disclosure in one embodiment, the messages of environment B (and A) may be available to the messaging client. In one aspect, a methodology of the present disclosure in one embodiment allows the user to access the application and its data for a "shared" application in environment B from environment A. For example, given the correct credentials (if necessary), the user in environment B is able to access the data stored in the application in environment A.

In the below description, the terms "first", "second", et seq. are used only to distinguish one element from another. Those terms do not impart any order in the meanings.

Figure 1:
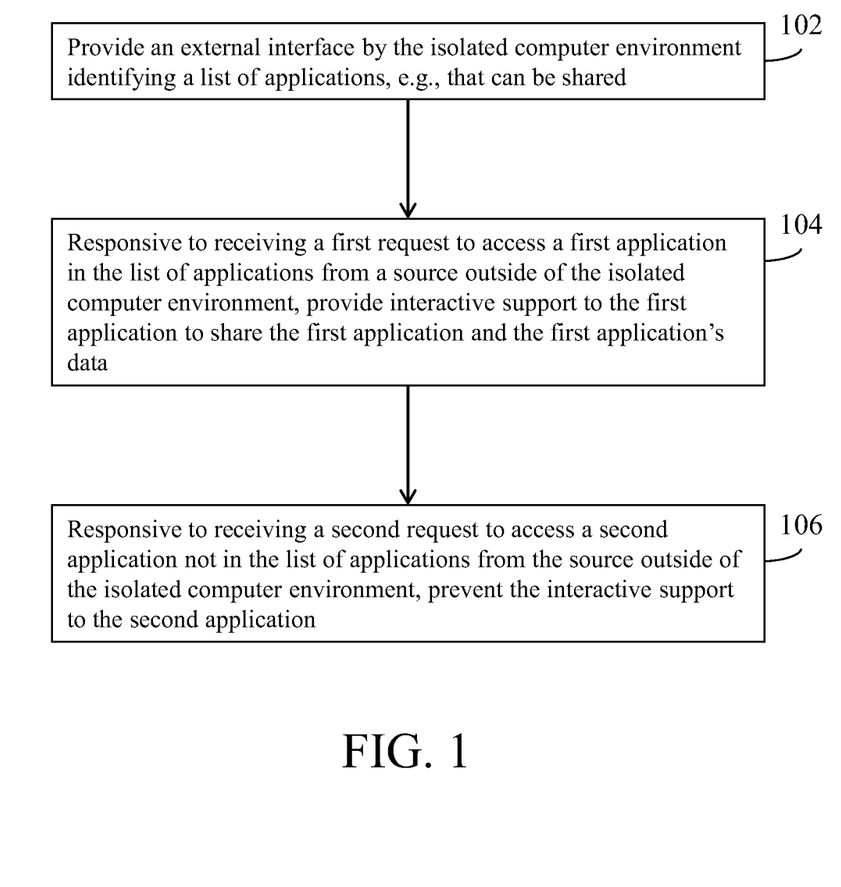
FIG. 1 is a flow diagram illustrating a method of interfacing with an isolated compute environment in one embodiment of the present disclosure.

FIG. 1 is a flow diagram illustrating a method of interfacing with an isolated compute environment in one embodiment of the present disclosure. For example, the method for sharing applications across multiple isolated compute environments on one or more compute devices. At 102, an external interface is provided by an isolated compute environment identifying a list of applications. In one aspect, a hypervisor may handle the traffic between the isolated compute environments. In another aspect, an operating system may include an agent/daemon/background service or process running across the host and the virtual machines (VMs). This daemon process may be in charge of providing the communication layer between the isolated environments. Isolated means that the different environments cannot communicate directly with each other, but instead only via the daemon process for this specific task. The application list that the daemon process provides may be made shareable (with or without proper credentials) by the daemon process on the host and/or by the daemon process on each VM. In one aspect, the daemon process on the host may be able to provide or restrict the sharing of any application and/or data on any VM; The daemon process on the VM may only be able to make sharable the applications and/or data on that VM.

An isolated computer or compute environment refers to a computer environment in which the components of the computer environment such as processors, memory, data storage, and/or one or more applications and associated application data are isolated from other components of a computing system. Examples of the isolated compute environment may include but are not limited to one or more of sandbox, a virtual machine (VM), a logical partition (LPAR), a desktop, a user account or user profile on a computer. An isolated environment cannot directly request and establish a connection with another isolated environment. For example, a VM without a network interface card (NIC) would be isolated from another VM with (or without) a NIC. As another example, the user accounts could be running on a single operating system, but would have no means of communicating with each other nor access each other's data.

A sandbox is a computer environment that is usually isolated from other components of a computing system, and communicates with the external world through well defined and monitored interfaces. Security software in the sandbox enforces policies that prevent unauthorized data to move out, and/or external applications to access the data. Applications or processes running in the sandbox may be restricted in what they can do. For example, the sandbox may allow for access to local data and provide a mechanism to prevent data from leaving the environment. In one aspect, the sandbox may include a protected set of computing resources (e.g., memory and disk storage) that are allocated and dedicated for a specific application. In one embodiment, the data loaded into the sandbox may be accessible only by the specific application and the specific mechanism the application uses.

Briefly, virtual machine (VM) is an operating system (OS) or application environment that emulates dedicated hardware, e.g., actions of a processor (e.g., a central processing unit (CPU)) or other hardware devices in utilizing a computer's resources. A virtual machine (VM), like a physical computer, runs an operating system and applications. A virtual machine (VM) may include a set of specification and configuration files and is supported by the physical resources of a host computer.

Briefly, a logical partition (LPAR) refers to a division or subset of computer's hardware resources (e.g., a computer's processors, memory, and storage) into multiple sets of resources virtualized as a separate computer. Each set of resources can be operated independently with its own operating system instance and applications. For example, a physical machine may be divided or partitioned into multiple logical partitions, each hosting a separate operating system. LPAR is similar to a VM.

At 104, responsive to receiving a first request to access a first application in the list of applications from a source outside of the isolated compute environment, interactive support may be provided to the first application. For example, the daemon service or an internal port/management bus may handle this processing. When the first request is triggered (for example, a user wants to open a message app in another environment, so the user clicks or selects an 'other environments' option or the like) the daemon on that environment may provide the list of environments that also share that application/data, or that environment daemon may ask the host daemon for the information. The user may then select the environment and, if necessary, provide the credentials for that environment. How the request are being sent and how the permissions are being set may depend on the implementation begin used. For example, sending and receiving of requests may be performed via a "management bus" like on a motherboard. As another example, sending and receiving may be network based or based on proprietary traffic on the internal port for the hypervisor.

As an example, a user on the user's mobile device that has different VMs for work, family, and friends has a text message app. The user can set on the mobile device the permission for family and friends VMs to have access to each others text message data. Whenever the user is in one VM, the user can see the data transmitted across from the other VM.

As another example, the same process is followed from a different perspective: information technology (IT) Admin. IT Admin may setup a "host" (e.g., a desktop) with 3 Virtual Machines: 1 Operating System A; 1 Operating System B; and 1 Operating System C. Operating system B environment is meant for generic emailing, messaging, Operating System C is intended to access customer environments only (e.g., managed services) and Operating System C VM is intended for graphical/video training/recording. The IT Admin may want to enable the data from a ticketing system that exists in the Operating System B Environment to provide the data in the Operating System C environment when accessing the customer environment, the IT Admin would not allow the data in the Operating System A Environment. The same scenario may hold true for the data from a video editing software in Operating System A environment to be available in Operating System C environment for publishing purposes.

Examples of the source may include but are not limited to one or more of sandbox, a virtual machine (VM), and a logical partition (LPAR). In one embodiment, the isolated compute environment provides a background agent, for example, one or more daemon processes, to provide the interactive support.

In one aspect, a user interface may be provided to allowing a user to select the different environments. The user interface may be a graphical user interface (GUI). The user interface may also be text based interface, e.g., a command prompt. As an example, for rendering the actual application/data from environment B in environment A, one or more of the following methodologies may be utilized: environment A may open a remote desktop/process sharing or the like, where the application from environment B would be visible in a 'window' in environment A; if environment A already has the application, environment A could use the application and render the data from environment B (with the application on environment A); if environment A does not have the application, but has the means to get the application (e.g., by downloading the application from an application repository/store), then environment A may obtain the application and render the data from environment B in the newly downloaded or obtained application on environment A. The methodologies of the present disclosure allows for sharing of data between different environments.

For security measures, in one embodiment, the isolated compute environment may require a verification code such as a password from a source before providing the interact support. Whether or from which of the sources a verification code is required may be preconfigured. For example, the isolated compute environment may have a list of trusted sources which do not require a verification code to share the first application, and/or a list of sources from which a verification code is required. There may be a list of trusted sources per application. Similarly, there may be list of sources from which a verification code is required on per application basis, in order to allow sharing of the application and its data.

In one embodiment, the isolated compute environment may detect access verification from a source, needed to access the first application. Responsive to detecting the access verification, the isolated compute environment may check and ensure that the access verification is correct before providing the interactive support. If the access verification is not correct, the isolated compute environment may deny access to the first application.

In one embodiment, responsive to verifying, the isolated compute environment allows the source to access to the first application, for example, by providing interactive support. Via the interactive support, the source may send data to the first application and receive information from the first application. The source may present the received information to the user, for example, via a graphical user interface (GUI). The location of the data that is sent to the first application may be local to the source (e.g., data stored in a load storage device, in the same computer facility as the source), remote to the source (e.g., connected via Internet, private virtual network (VPN) or others), and/or a cloud that provides service to the source.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models.

A cloud computing environment is usually service oriented with a focus on statelessnesss, low coupling, modularity, and semantic interoperability. At the heart of cloud computing is an infrastructure comprising a network of interconnected nodes. It is understood in advance that although this disclosure includes a description on cloud computing, implementation of the teachings recited herein are not limited to a cloud computing environment. Rather, embodiments disclosed herein are capable of being implemented in conjunction with any other type of computing environment now known or later developed, as applicable.

At 106, responsive to receiving a second request to access a second application not in the list of applications from the source outside of the isolated compute environment, interactive support to the second application may be prevented or denied.

Figure 2:
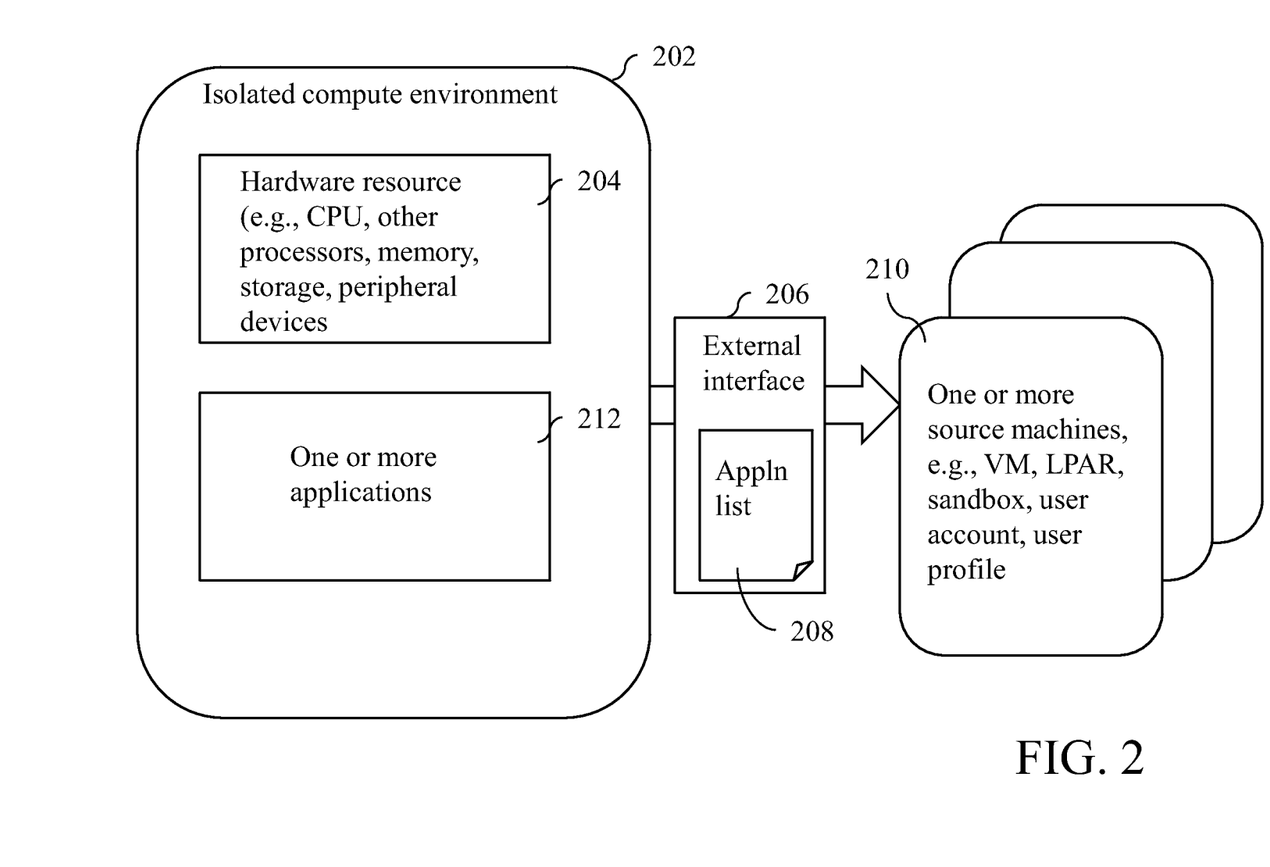
FIG. 2 is a diagram illustrating components for interfacing with an isolated compute environment in one embodiment of the present disclosure.

FIG. 2 is a diagram illustrating components for interfacing with an isolated compute environment in one embodiment of the present disclosure. As described above, an isolated compute environment 202 may include a plurality of hardware resources 204 within the isolated compute environment 202. One or more applications 212 reside within the isolated compute environment and are executable in the isolated compute environment. The isolated compute environment may provide an external interface 206 identifying a list of applications 208 that can be shared with another source, e.g., another machine, or one or more machines 210. The isolated compute environment 202 and the one or more machines 210 may physically reside on a same physical computer or a cluster of computers. In another aspect, the isolated compute environment 202 and the one or more machines 210 may physically reside on different a physical computer or a cluster of computers. Responsive to receiving a first request to access a first application in the list of applications from a source outside of the isolated compute environment, the isolated compute environment provides interactive support to the first application to share the first application and the first application's data. Responsive to receiving a second request to access a second application not in the list of applications from the source outside of the isolated compute environment, the isolated compute environment prevents the interactive support to the second application. The isolated compute environment further performs the functions described above with reference to FIG. 1.

Non-limiting examples of the isolated compute environment may include one or more of sandbox, a virtual machine, a logical partition, a desktop, a user account, or a user profile. Non-limiting examples of the source may include one or more of a virtual machine, a logical partition, a desktop, a user account, or a user profile.

Figure 3:
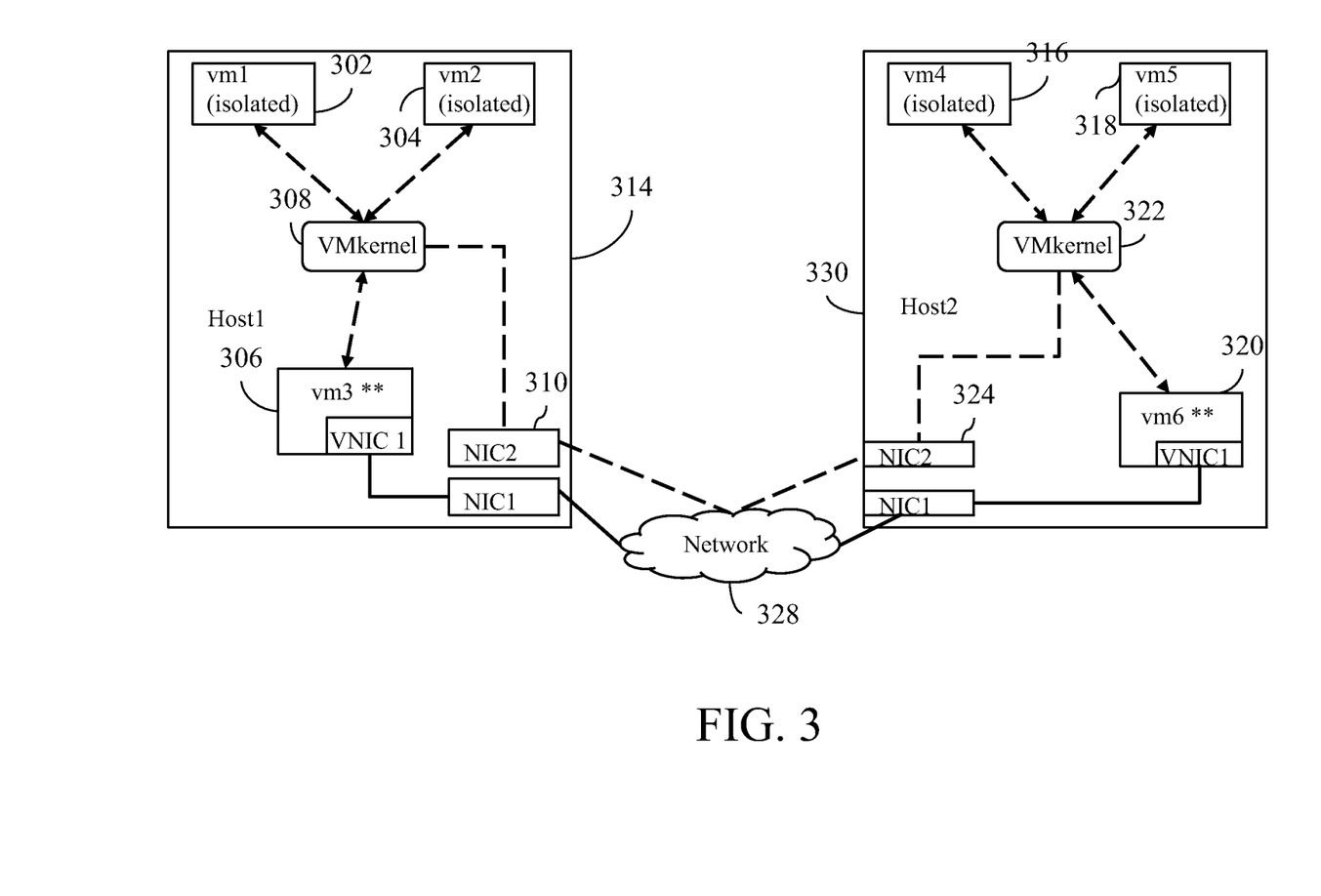
FIG. 3 is a diagram illustrating components of example compute environments that implement a methodology of the present disclosure in one embodiment.

FIG. 3 is a diagram illustrating a hypervisor environment as an example compute environment implementing a methodology of the present disclosure in one embodiment. A methodology of the present disclosure in one embodiment may leverage VMkernel type of technology in Type 1 or Type 2 case hypervisor. Briefly, Type 1 hypervisors run directly on the system hardware, e.g., built into the firmware; Type 2 hypervisors run on a host operating system. For instance, in Host1 314, VM1 302 which has no physical connectivity to the outside world may be managed by Host1's VMkernel internal port 308. The host 314 understands many aspects to VM1 302 including its health. A methodology of the present disclosure in one embodiment leverages a VMkernel port 308 and expands this technology. In one embodiment, VMkernel port 308 may manage the rules and authentication associated with what is allowed between isolated and non-isolated systems, shown by paths with dashed lines in the figure. If an isolated system (e.g., 302, 304) in Host1 314 needs to communicate to an isolated system (e.g., 316, 318) in Host 2 330 (e.g., vm2 304 to vm5 318), the VMkernel 308 in Host1 314 would request/send information through a "true physical" network adapter (e.g., NIC2) 310 via the path shown in dashed lines. The same holds true for vm3 306 communication to vm6 320, vm3 306 to vm5 318, or vm4 316 to vm6 320, etc. In one embodiment, the "shared data" does not traverse through the path (shown in solid lines) of a real physical network. For instance, in this embodiment, communications between VMs are performed through the VMkernel internal port (e.g., 308, 322), e.g., via NIC2s (310, 324) and e.g., a network 328. The vms shown at 306 and 320 can be isolated through firewalls and access control lists (ACLs), but does not necessarily need to be isolated. In both cases, the methodology of the present disclosure applies. In the non-isolated case, the information may be obtained through regular networking.

Figure 4:
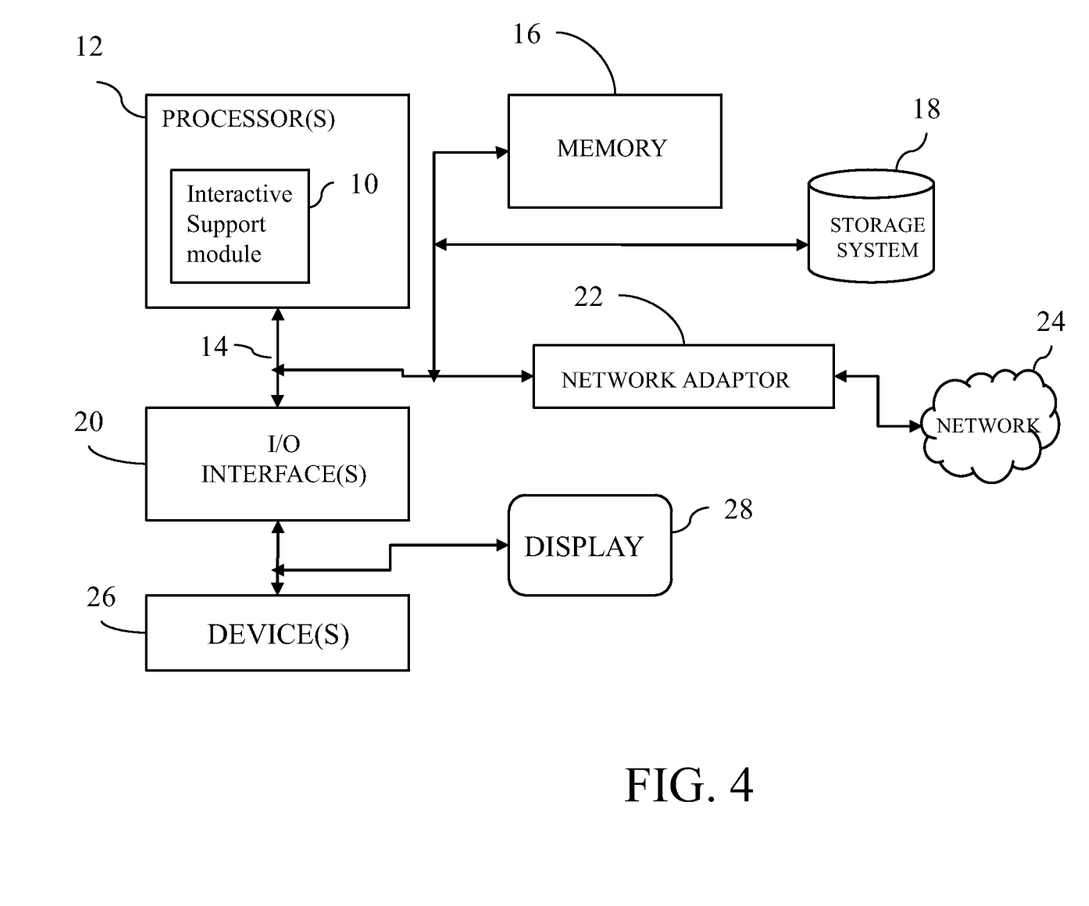
FIG. 4 illustrates a schematic of an example computer or processing system that may implement a system for interfacing with an isolated environment in one embodiment of the present disclosure.

FIG. 4 illustrates a schematic of an example computer or processing system that may implement a system for interfacing with an isolated environment in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), cellular, wireless local area network (WLAN), satellite, and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, wireless network, and/or a storage area network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of interfacing with an isolated compute environment, comprising:
    providing an external interface by the isolated compute environment identifying a list of applications;
    responsive to receiving a first request to access a first application in the list of applications from a source outside of the isolated compute environment, providing interactive support to the first application to share the first application and the first application's data; and
    responsive to receiving a second request to access a second application not in the list of applications from the source outside of the isolated compute environment, preventing the interactive support to the second application,
    the isolated compute environment comprising a sandbox that is isolated from other components in a computer system,
    the interactive support comprising a daemon process on the compute environment making sharable only the applications on the compute environment,
    the source outside the isolated compute environment comprising another isolated environment.

2. The method of claim 1, wherein the isolated compute environment further comprises at least a virtual machine without a network interface card.

3. The method of claim 1, wherein the source comprises one or more of a virtual machine, a logical partition, a desktop, a user account, or a user profile.

4. The method of claim 1, wherein the isolated compute environment further comprises at least a logical partition without a capacity to directly request and establish a connection with said another isolated environment.

5. The method of claim 4, wherein the logical partition is a division of the computer system comprising multiple logical partitions, each of the multiple logical partitions operating independently on a set of hardware resources in the computer system with an operating system.

6. The method of claim 1, wherein access verification is required to share the first application, and responsive to detecting the access verification, ensuring the access verification is correct before providing the interactive support.

7. The method of claim 1, wherein the source sends data to the first application and receives information from the first application.

8. The method of claim 7, wherein responsive to receiving the information from the first application, the source presents the information to a user.

9. The method of claim 7, wherein a location of the data comprises one or more of local location to the source, remote location to the source, or a cloud.

10. A non-transitory computer readable storage medium storing a program of instructions executable by a machine to perform a method of interfacing with an isolated compute environment, the method comprising:
    providing an external interface by the isolated compute environment identifying a list of applications;
    responsive to receiving a first request to access a first application in the list of applications from a source outside of the isolated compute environment, providing interactive support to the first application to share the first application and the first application's data; and
    responsive to receiving a second request to access a second application not in the list of applications from the source outside of the isolated compute environment, preventing the interactive support to the second application,
    the isolated compute environment comprising a sandbox that is isolated from other components in a computer system,
    the interactive support comprising a daemon process on the compute environment making sharable only the applications on the compute environment,
    the source outside the isolated compute environment comprising another isolated environment.

11. The non-transitory computer readable storage medium of claim 10, wherein the isolated compute environment further comprises at least a virtual machine without a network interface card.

12. The non-transitory computer readable storage medium of claim 10, wherein the source comprises one or more of a virtual machine, a logical partition, a desktop, a user account, or a user profile.

13. The non-transitory computer readable storage medium of claim 10, wherein the isolated compute environment further comprises at least a logical partition without a capacity to directly request and establish a connection with said another isolated environment.

14. The non-transitory computer readable storage medium of claim 10, wherein the logical partition is a division of the computer system comprising multiple logical partitions, each of the multiple logical partitions operating independently on a set of hardware resources in the computer system with an operating system.

15. The non-transitory computer readable storage medium of claim 10, wherein access verification is required to share the first application, and responsive to detecting the access verification, ensuring the access verification is correct before providing the interactive support.

16. The non-transitory computer readable storage medium of claim 10, wherein the source sends data to the first application and receives information from the first application.

17. The non-transitory computer readable storage medium of claim 16, wherein a location of the data comprises one or more of local location to the source, remote location to the source, or a cloud.

18. A system of interfacing with an isolated compute environment, comprising:
    a plurality of hardware resources within the isolated compute environment;
    one or more applications executable in the isolated compute environment; and
    an external interface provided by the isolated compute environment identifying a list of applications,
    wherein responsive to receiving a first request to access a first application in the list of applications from a source outside of the isolated compute environment, the isolated compute environment provides interactive support to the first application to share the first application and the first application's data,
    responsive to receiving a second request to access a second application not in the list of applications from the source outside of the isolated compute environment, the isolated compute environment prevents the interactive support to the second application,
    the isolated compute environment comprising a sandbox that is isolated from other components in a computer system,
    the interactive support comprising a daemon process on the compute environment making sharable only the applications on the compute environment,
    the source outside the isolated compute environment comprising another isolated environment.

19. The system of claim 18, wherein the isolated compute environment comprises at least a virtual machine without a network interface card.

20. The system of claim 1, wherein the source comprises one or more of a virtual machine, a logical partition, a desktop, a user account, or a user profile.

* * * * *